(12) United States Patent
Qi et al.

(10) Patent No.: US 10,254,581 B2
(45) Date of Patent: Apr. 9, 2019

(54) FABRICATING METHOD OF COLOR FILTER SUBSTRATE, COLOR FILTER SUBSTRATE AND DISPLAY DEVICE

(71) Applicant: BOE TECHNOLOGY GROUP CO., LTD., Beijing (CN)

(72) Inventors: Yonglian Qi, Beijing (CN); Shi Shu, Beijing (CN); Guanbao Hui, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 439 days.

(21) Appl. No.: 14/348,444

(22) PCT Filed: Jun. 4, 2013

(86) PCT No.: PCT/CN2013/076696
§ 371 (c)(1),
(2) Date: Mar. 28, 2014

(87) PCT Pub. No.: WO2014/139221
PCT Pub. Date: Sep. 18, 2014

(65) Prior Publication Data
US 2015/0153614 A1 Jun. 4, 2015

(30) Foreign Application Priority Data
Mar. 11, 2013 (CN) .......................... 2013 1 0076478

(51) Int. Cl.
G02B 5/20 (2006.01)
G02F 1/1335 (2006.01)
(52) U.S. Cl.
CPC ......... *G02F 1/133514* (2013.01); *G02B 5/20* (2013.01); *G02B 5/201* (2013.01); *G02F 1/133516* (2013.01); *G02F 1/133512* (2013.01)

(58) Field of Classification Search
CPC ........ F21S 10/00; F21S 10/005; F21S 10/007; F21S 10/02; F21S 10/023; F21S 10/026;
(Continued)

(56) References Cited

U.S. PATENT DOCUMENTS

2004/0146791 A1 7/2004 Sakurada et al.
2014/0078452 A1 3/2014 Lu et al.

FOREIGN PATENT DOCUMENTS

CN 1503011 A 6/2004
CN 101051128 A 10/2007
(Continued)

OTHER PUBLICATIONS

CN101329468 (A) English machine translation.*
(Continued)

Primary Examiner — Evan P Dzierzynski
Assistant Examiner — Sharrief I Broome
(74) Attorney, Agent, or Firm — Ladas & Parry LLP

(57) ABSTRACT

A fabricating method of color filter substrate includes a step of forming a black matrix pattern and a color filter layer pattern on a substrate. The black matrix pattern partitions a plurality of sub-pixel regions on the substrate, the color filter layer covers over the plurality of sub-pixel regions, the sub-pixel region includes a transmissive region and/or a reflective region. Before forming the color filter layer pattern the fabricating method further comprises a step of forming a plurality of recesses on the substrate. Each transmissive region in the sub-pixel regions corresponds to a respective recess in terms of location. Correspondingly, the invention provides a color filter substrate fabricated by such fabricating method, as well as a display device comprising such color filter substrate. The fabricating method as provided by the present invention can achieve an effect of color coordi-
(Continued)

nation and reduce the number of processes and the thickness of the planarizing protective layer.

15 Claims, 2 Drawing Sheets

(58) Field of Classification Search
CPC ......... F21S 359/89; G02B 5/003; G02B 5/20; G02B 5/201; G02B 5/208; G02B 5/22; G02B 5/223
See application file for complete search history.

(56) References Cited

FOREIGN PATENT DOCUMENTS

| CN | 101329468 | * 12/2008 | ........... G02F 1/1355 |
|---|---|---|---|
| CN | 101329468 B | 12/2010 | |
| CN | 102707355 A | 10/2012 | |

OTHER PUBLICATIONS

International Preliminary Report on Patentability Appln. No. PCT/CN2013/076696; dated Sep. 15, 2015.
International Search Report dated Dec. 19, 2013; PCT/CN2013/076696.
First Chinese Office Action dated May 5, 2014; App-In. No. 201310076478.8.
Second Chinese Office Action Appln. No. 201310076478.8; Dated Dec. 11, 2014.
Third Chinese Office Action dated May 14, 2015; Appln. No. 201310076478.8.

* cited by examiner

US 10,254,581 B2

FABRICATING METHOD OF COLOR FILTER SUBSTRATE, COLOR FILTER SUBSTRATE AND DISPLAY DEVICE

TECHNICAL FILED

The present invention relates to a technical field of a liquid crystal display (LCD), in particular, to a fabricating method of color filter substrate, a color filter substrate fabricated from such fabricating method, and a display device comprising such color filter substrate.

BACKGROUND

Since the LCD is a non-self-emitting display, the display panel thereof needs to be configured with light sources (such as backlight source, front light source or external light source) for displaying images. The LCD can be classified into transmissive display, transflective display and reflective display, in terms of the utilization patterns of light source. Wherein, the transflective display exhibits excellent effect of display under both sunshine environment in the open air and zero-light or low-light environment, because it utilizes the luminous beams emitted from both external light source and backlight source, thus has been attracting more and more attentions.

The display panel in the transflective display usually is formed by engaging an array substrate with a color filter (color filter) substrate and filling liquid crystals there-between. The color filter substrate comprises black matrix (black matrix), color filter layer and planar over coat (OC) layer which are disposed on a substrate; a pattern of the black matrix partitions a plurality of sub-pixel regions on the substrate, and the color filter layer covers over the plurality of sub-pixel regions. Each of the sub-pixel regions can be divided into a transmissive region and a reflective region, wherein the reflective region is provided with reflective electrode or reflective layer thereon, which are adapted for reflecting the luminous beams reflected by an external light source (such as sunshine or lamplight). It can be seen that, the luminous beam entering into the reflective region will pass through the RGM filter layer twice, while the luminous beam entering into the transmissive region will pass through the RGM filter layer only once, thus the images displayed through the transmissive region and reflective region in the same sub-pixel region will lose color coordination.

In order to solve the problem above, it's conventional to adjust the thickness of color filter layer in the color filter substrate to increase the thickness of color filter layer corresponding to the transmissive region or decrease the thickness of color filter layer corresponding to the reflective region, so that the images presented in the transmissive region and in the reflective region will be uniform and consistent in color, thereby obtaining effect of color coordination.

SUMMARY

The present invention provides a fabricating method of color filter substrate which can achieve an effect of color coordination and reduce the number of processes and the thickness of planarizing protective layer, a color filter substrate fabricated by such fabricating method, and a display device comprising such color filter substrate.

The fabricating method of the color filter substrate comprises a step of forming a black matrix pattern and a color filter layer pattern on a substrate. The black matrix pattern partitions a plurality of sub-pixel regions on the substrate, and the color filter layer covers over the plurality of sub-pixel regions. The sub-pixel region comprises a transmissive region and/or a reflective region. Before forming the color filter layer pattern, the fabricating method further comprises a step of forming a plurality of recesses on the substrate. Each transmissive region in the sub-pixel regions corresponds a respective recess in terms of location.

In an example, the step of forming the color filter layer pattern comprises: applying color photoresist on the substrate formed with the plurality of recesses; exposing and developing the color photoresist by using a mask to form a remaining region and a removed region on the color photoresist. The color photoresist in the remaining region correspondingly forms the color filter layer pattern, and the color photoresist in the removed region is fully removed.

In an example, the recess has a depth which is 0.4~0.6 time of a thickness of the color filter layer covering over the recess.

In an example, the recess has a depth which is 0.5 time of a thickness of the color filter layer covering over the recess.

In an example, the color filter layer at least comprises a red color filter layer, a green color filter layer and a blue color filter layer. The black matrix pattern is in a form of mesh. Each transmissive region in the sub-pixel regions has a cross sectional shape which is the same as that of a recess corresponding to the transmissive region.

In an example, the fabricating method further comprises a step of forming a planarizing protective layer on a side of the black matrix pattern and of the color filter layer pattern facing away from the substrate.

In an example, the fabricating method further comprises a step of forming a common electrode pattern and a spacer pattern on a side of the planarizing protective layer facing away from the substrate;

Alternatively the fabricating method further comprises a step of forming a backside shielding electrode pattern on a side of the substrate without the black matrix pattern and color filter layer pattern, and a step of forming a spacer pattern on a side of the planarizing protective layer facing away from the substrate.

The present invention further provides a color filter substrate comprising a substrate, a black matrix and a color filter layer disposed on the substrate. The black matrix partitions a plurality of sub-pixel regions on the substrate, and the color filter layer covers over the plurality of sub-pixel regions; the sub-pixel region comprises a transmissive region and/or a reflective region. A plurality of recesses is provided on the substrate, and each transmissive region in the sub-pixel regions corresponds a respective recess in terms of location.

In an example, the recess has a depth which is 0.4~0.6 time of a thickness of the color filter layer covering over the recess.

In an example, the recess has a depth which is 0.5 time of a thickness of the color filter layer covering over the recess.

In an example, the color filter layer at least comprises a red color filter layer, a green color filter layer and a blue color filter layer; the black matrix forms a pattern in a form of mesh; each transmissive region in the sub-pixel regions has a cross sectional shape which is the same as that of a recess corresponding to the transmissive region.

In an example, the color filter substrate further comprises a planarizing protective layer disposed on a side of the black matrix and of the color filter layer facing away from the substrate.

In an example, the color filter substrate further comprises a common electrode and a spacer.

The common electrode is disposed on a side of the planarizing protective layer facing away from the substrate, and the spacer is disposed on a side of the common electrode facing away from the substrate;

Alternatively, the spacer is disposed on a side of the planarizing protective layer facing away from the substrate, and the common electrode is disposed on a side of the spacer facing away from the substrate.

In an example, the color filter substrate further comprises a backside shielding electrode and a spacer.

The backside shielding electrode is disposed on a side of the substrate without the black matrix and the color filter layer, and the spacer is disposed on a side of the planarizing protective layer facing away from the substrate.

The present invention further provides a display device comprising such color filter substrate.

Since the fabricating method of color filter substrate provided by the present invention forms a plurality of recesses on the substrate in advance and makes each transmissive region in the sub-pixel regions corresponding to a respective recess in terms of location. As a result, for the color filter layers of the same color, the color filter layer corresponding to the transmissive region (i.e., covering over the transmissive region) has a thickness greater than that of the color filter layer corresponding to the reflective region (i.e., covering over the reflective region), and the thickness difference between color filter layers corresponding to transmissive region and reflective region can be adjusted by adjusting the depth of the recess, thereby achieving the effect of color coordination and reducing the number and duration of the processes.

Since the color filter layer is formed by means of coating (e.g., by means of spin coating), although the color filter layers corresponding to the transmissive region and reflective region have different thickness, the surfaces of the color filter layer corresponding to the transmissive region and reflective region respectively have a certain flatness, that is, the surface of the color filer layer have no step difference or only a slight step difference. Therefore, the planarizing protective layer formed on the color filter layer and on the black matrix is thinner than the planarizing protective layer in a conventional transflective display (similar to the thickness of the planarizing protective layer in a conventional transmissive display or reflective display), thereby saving materials.

The fabricating method of the color filter substrate according to the present invention has advantages such as simple process, practical operability and high reliability.

BRIEF DESCRIPTION OF THE DRAWINGS

In order to better explain the technical solution of the present disclosure or the prior art, hereinafter the drawings necessary for the description of the technical solution as provided by the present disclosure or the prior art will be described briefly. Obviously, the drawings referred by the following description are only illustration of a part of detailed embodiments of the technical solution according to the present disclosure, based on which those skilled in the art can derive other drawings without any creative labor.

Figure 1:
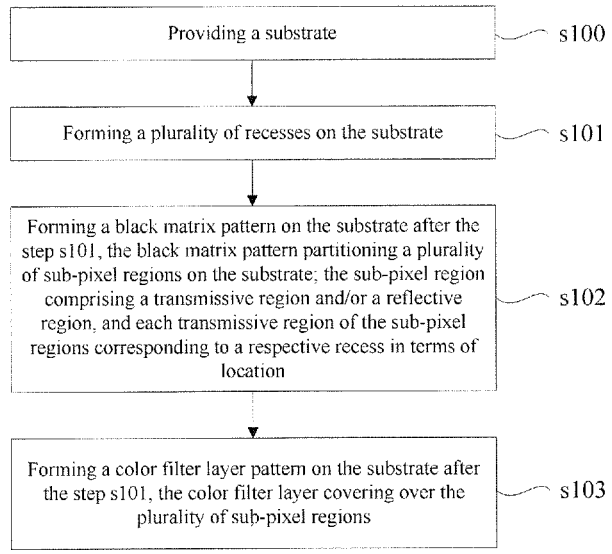
FIG. 1 is a flow chart illustrating a fabricating method of color filter substrate according to a first embodiment of the present invention.

In the drawings, 1—substrate; 2—black matrix; 3—recess; 4—red color filter layer; 5—green color filter layer; 6—blue color filter layer; 7—planarizing protective layer; I—transmissive region; II—reflective region.

DETAILED DESCRIPTION OF THE PREFERRED EMBODIMENTS

Hereinafter the technical solutions of embodiments according to the present disclosure will be described clearly and completely. Obviously, those described herein are only part but not all of the embodiments of the present disclosure. All other embodiments that can be made by those skilled in the art without any creative labor based on the embodiments of the present disclosure shall be included within the scope of the present disclosure.

Unless specified otherwise, the technical terms or scientific terms used herein shall refer to common meanings known to a common skilled person in the filed to which the present disclosure is pertaining. The wordings "first", "second" and the same that are used in the specification do not indicate any sequence, amount or importance, but only to distinguish different components. Likewise, wordings such as "one" or "a" and the same do not indicate any limit to the amount either, but indicate an existence of at least one. Wordings "connect" or "connect with" and the same are not limited to physical or mechanical connection, but can include electrical connection in either direct or indirect way. Wordings "upper", "lower", left", "right" and the same are used to indicate relative location relations which vary correspondingly with the absolute location of the described object.

Typically, the color filter layer in a transflective display is fabricated as following.

Method I: a color photoresist layer is formed on a substrate formed with a black matrix; and the color photoresist layer is exposed and developed by using a mask to form a color filter layer corresponding to the transmissive region, and the color filter layer in the reflective region is provided with light-transmission holes enabling the lights directly passing therethrough, so as to achieve color coordination. For color filter layers of different colors, the reflective regions can be different in both shapes and sizes in this method, thus it is impossible to share a common mask. In case that the color filter layer comprises a red color filter layer, a green color filter layer and a blue color filter layer, it requires three pieces of masks and three exposing and developing processes to fabricate the color filter layer by using Method I. The fabrication cost is relatively high due to the relatively large number of utilized masks.

Method II: a color photoresist layer is formed on a substrate formed with a black matrix; and the color photoresist layer exposed and developed by using a half-tone or grey-tone mask. The half-tone or grey-tone mask comprises a mask non-transmissive region, a mask partially-transmissive region, and a mask transmissive region. In an example of a positive color photoresist, the mask non-transmissive region correspondingly forms a color photoresist remaining region (i.e., forming a color filter layer corresponding to the transmissive region) on the color photoresist, the mask partially-transmissive region correspondingly forms a photoresist partially-remaining region (i.e., forming a color filter layer corresponding to the reflective region) on the color photoresist, and the mask transmissive region correspondingly forms a photoresist fully-removed region on the color photoresist. Thus the color filter layer corresponding to the transmissive region has a thickness greater than that of the color filter layer corresponding to the reflective region, so as to achieve color coordination. In case that the color filter layer comprises a red color filter layer, a green color filter layer and a blue color filter layer, it requires one piece of half-tone or grey-tone mask (because the red color filter layer, green color filter layer and blue color filter layer have the same pattern and hence can share a same mask) and three exposing and developing processes to fabricate the color filter layer by using method II. Therefore the number of utilized masks is considerably decreased, in comparison with Method I. However, it's not easy to precisely control the exposure degree of the partially-transmissive region and hence the thickness of the color filter layer corresponding to the reflective region, therefore the effect of color coordination is not quite desirable.

Method III: firstly a color photoresist layer is formed on a substrate formed with black matrix, and the color photoresist layer is exposed and developed by using a mask to form a first color filter layer corresponding to the transmissive region; then another color photoresist layer is further formed on the substrate, and the another color photoresist layer is exposed and developed by using another mask to form a second color filter layer corresponding to the transmissive region and a color filter layer corresponding to the reflective region. The second color filter layer corresponding to the transmissive region is formed right above the first color filter layer, thus the first color filter layer and second color filter layer corresponding to the transmissive region have a thickness greater than that of the color filter layer corresponding to the reflective region, and the thickness difference between color filter layers corresponding to transmissive region and reflective region can be adjusted by adjusting the thicknesses of the color photoresist layers formed in two steps so as to achieve effect of color coordination. However, in comparison with Method II, when fabricating the color filter layer by using Method III, both the number of utilized masks and the number of exposing and developing processes are increased. For example, in case that the color filter layer comprises a red color filter layer, a green color filter layer and a blue color filter layer, it requires two pieces of masks and six exposing and developing processes to fabricate the color filter layer by using Method III, thereby the number and duration of processes are increased, which in turn increases the fabricate cost.

Also in the color filter layer fabricated by the above-mentioned methods, since the color filter layer corresponding to the transmissive region has a thickness greater than that of the color filter layer corresponding to the reflective region, the step difference of the color filter substrate corresponding to the color filter layer is increased. In order to eliminate such step difference, the planarizing protective layer in the color filter substrate corresponding to the color filter layer is even thicker than that of the planarizing protective layer in the color filter substrate of a conventional transmissive display or reflective display. Therefore the above-mentioned methods might also involve disadvantages such as materials wasting.

The First Embodiment

As shown in FIG. 1, the present embodiment provides a fabricating method of color filter substrate comprising following steps.

s100, a substrate is provided. The substrate is free of dust or impurity ion after cleaning. The substrate may be a transparent substrate in a form of glass substrate, quartz substrate or plastic substrate.

s101, a plurality of recesses are formed on the substrate. The plurality of recesses may be formed for example by applying a layer of photoresist on the substrate; exposing and developing the photoresist by using a mask to form a photoresist remaining region and a photoresist removed region on the substrate; then etching the exposed portion of the substrate; and peeling off the remaining photoresist by means of photoresist stripping technology to form a plurality of recesses. The photoresist removed region corresponds to an area of the plurality of recesses.

s102, a black matrix pattern is formed on the substrate after the step s101. The black matrix pattern partitions a plurality of sub-pixel regions on the substrate; the sub-pixel region comprises a transmissive region and/or a reflective region, and each transmissive region of the sub-pixel regions corresponds to a respective recess in terms of location.

The sub-pixel region comprising a transmissive region and/or a reflective region refers to that each sub-pixel region comprises both the transmissive region and the reflective region; Alternatively some of the sub-pixel regions comprise only the transmissive region, and some of the sub-pixel regions comprise only the reflective region. Of course, in any case, the recesses are formed only at locations of the transmissive regions on the substrate. In case that each sub-pixel region comprises both the transmissive region and the reflective region, the two regions are not limited in shapes or locations. For example, the transmissive region and reflective region may be located at left and right side of the sub pixl region, respectively; Alternatively the transmissive region is located at the center, and the reflective region surround the transmissive region.

The black matrix may be made from resin or metal.

s103, a color filter layer pattern is formed on the substrate after the step s101. The color filter layer covers over the plurality of sub-pixel regions.

In an example, the step of forming the color filter layer pattern may comprise: applying a color photoresist on the substrate formed with black matrix pattern and the plurality of recesses, for example by means of spin coating; exposing and developing the color photoresist by using a mask to form a remaining region and a removed region on the color photoresist. The color photoresist in the remaining region correspondingly forms the color filter layer pattern, and the color photoresist in the removed region is fully removed.

In an example, the color filter layer at least comprises a red color filter layer, a green color filter layer and a blue color filter layer. It is noted that the color filter layer is not limited to the red color filter layer, the green color filter layer and the blue color filter layer, but can also comprise a yellow filter layer, a transparent color filter layer, a crimson color filter layer, a purple color filter layer, and so on. Any color filter layers of any single color and color combination or variation thereof conceivable by a person skilled in the art may be used as the color filter layer according to the embodiment of the present invention.

It should be noted that in the present embodiment, the steps s101, s102 and s103 do not have a fixed sequence, but can also have other sequences such as s102→s101→s103 or a s101→s103→s102. That is to say, it is possible to firstly form the black matrix pattern on a substrate, then form a plurality of recesses on the substrate formed with the black matrix pattern, and then form the color filter layer pattern on the substrate formed with the black matrix pattern and the plurality of recesses. It is also possible to firstly form a plurality of recesses on a substrate, then form color filter layer pattern on the substrate formed with the plurality of recesses, and then form the black matrix pattern on the substrate formed with the plurality of recesses and the color filter layer pattern.

For the color filter layers of the same color, since the color filter layer pattern is formed in the recesses in the transmissive region, the color filter layer in the transmissive region of the color filter substrate has a thickness greater than that of the color filter layer in the reflective region. Furthermore, the thickness difference between the color filter layers in the transmissive region and the reflective region can be adjusted by adjusting the depth of the plurality of recesses, so as to obtain the effect of color coordination.

The Second Embodiment

Figure 2:
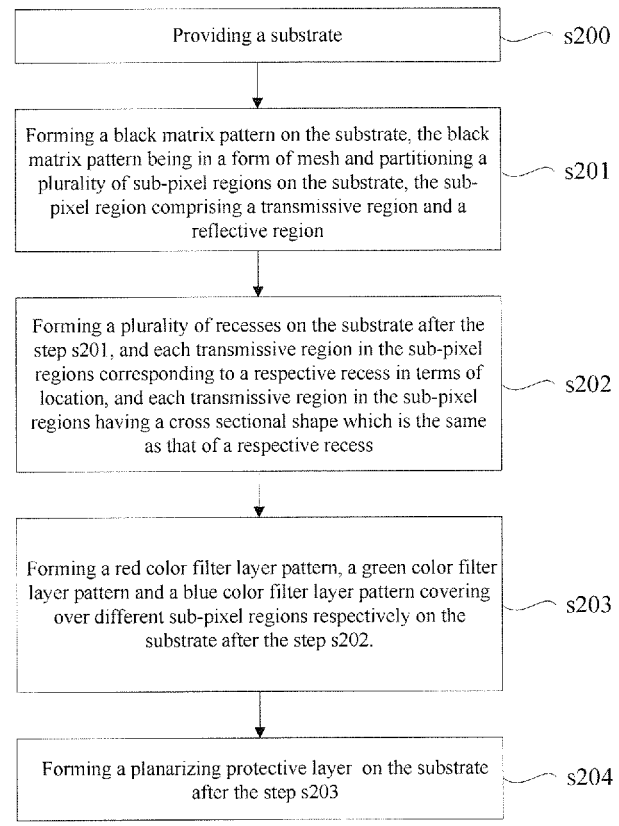
FIG. 2 is a flow chart illustrating a fabricating method of color filter substrate according to a second embodiment of the present invention.

As shown in FIG. 2, the present embodiment provides a fabricating method of color filter substrate comprising following steps.

s200, a substrate is provided.

Figure 3:
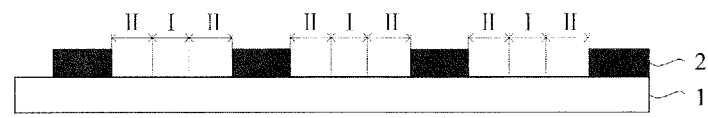
FIG. 3 is a structural schematic view illustrating the color filter substrate after the step S201 shown in FIG. 2.

The substrate is free of dust or impurity ion after cleaning. The substrate may be a transparent substrate in a form of glass substrate, quartz substrate or plastic substrate.

s201, a black matrix pattern is formed on the substrate. The black matrix pattern is in a form of mesh and partitions a plurality of sub-pixel regions on the substrate. The sub-pixel region comprises a transmissive region and a reflective region. The structure of a color filter substrate after this step is shown in FIG. 3. In the present embodiment, the sub-pixel region has a reflective region II surrounding the transmissive region I so as to obtain better display effect.

Figure 4:
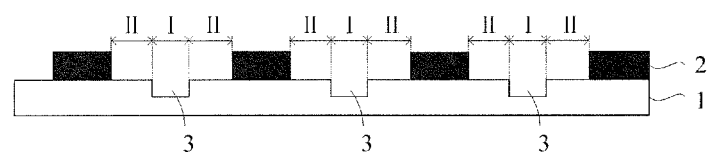
FIG. 4 is a structural schematic view illustrating the color filter substrate after the step S202 shown in FIG. 2.

For example, the black matrix may be made from metallic material by depositing a thin film of black matrix on the substrate 1; then applying a layer of photoresist on the thin film of black matrix; and exposing and developing the photoresist by using a mask to form a photoresist remaining region corresponding to the black matrix pattern and a photoresist removed region on the substrate; and then etching the exposed portion of the thin film of black matrix; and finally peeling off the remaining photoresist by means of photoresist stripping technology to form the black matrix 2. For example, the black matrix 2 may be also made from a photo-sensitive resin, and it is possible to directly expose and develop the photo-sensitive resin by utilizing the photosensitivity thereof to fabricate the pattern of black matrix 2 without additional photoresist.

s202, a plurality of recesses are formed on the substrate after the step s201, and each transmissive region in the sub-pixel regions corresponds to a respective recess in terms of location, and each transmissive region in the sub-pixel regions has a cross sectional shape which is the same as that of a respective recess. The cross section of the transmissive region is in parallel with the surface of the substrate. The structure of a substrate after this step is shown in FIG. 4.

Figure 5:
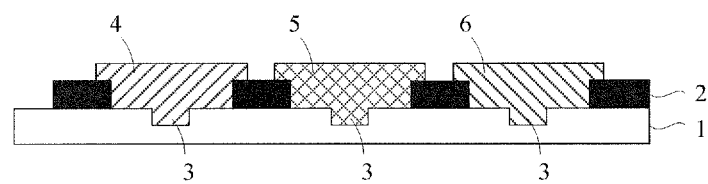
FIG. 5 is a structural schematic view illustrating the color filter substrate after the step S203 shown in FIG. 2.

For example, a layer of photoresist is applied on the substrate after the step s201. The photoresist is exposed and developed by using a mask to form a photoresist remaining region and a photoresist removed region on the substrate. The photoresist removed region corresponds to the plurality of recesses. Then the exposed portion of the substrate is etched; and, finally the remaining photoresist by means of photoresist stripping technologies to form a plurality of recesses 3.

s203, a red color filter layer pattern, a green color filter layer pattern and a blue color filter layer pattern (i.e., the color filter layer pattern, illustrated as a filter layer pattern comprising three colors of red, green and blue, without any limitation to the invention) are formed on the substrate after the step s202. The red color filter layer pattern, the green color filter layer pattern and the blue color filter layer pattern covers over different sub-pixel regions, respectively. The structure of a substrate after this step is shown in FIG. 5.

In an example, the recess 3 has a depth which is 0.4~0.6 time of a thickness of the red color filter layer 4/green color filter layer 5/blue color filter layer 6 covering over the recess 3. For example, the recess 3 has a depth of 0.5 μm~1.0 μm.

In an example, the recess 3 has a depth which is 0.5 time of a thickness of the red color filter layer 4/green color filter layer 5/blue color filter layer 6; i.e., the color filter layer (i.e., the red color filter layer 4, green color filter layer 5 or blue color filter layer 6) covering over the recess has a thickness which is 2 times of that of the color filter layer covering over the reflective region II in the sub-pixel region corresponding to the recess.

It is noted that in the respect of color coordination, the recesses covered by color filter layers of different colors may have different depths; that is to say, all the recesses formed on the substrate may not have the same depth, and a person skilled in the art can design the respective depths of recesses corresponding to color filter layers of different colors according to real needs.

In the present step, the red color filter layer pattern, green color filter layer pattern and blue color filter layer pattern may be formed in any sequence without limitation.

Hereinafter the step s203 is described in details in an example where the red color filter layer pattern, the green color filter layer pattern and the blue color filter layer pattern are successively formed on a substrate after the step s202.

Figure 6:
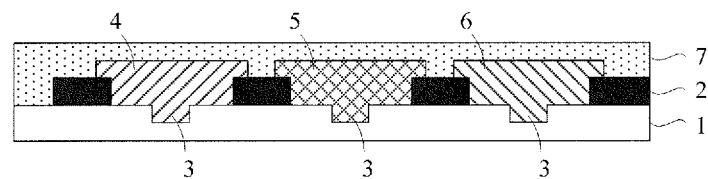
FIG. 6 is a structural schematic view illustrating the color filter substrate after the step S204 shown in FIG. 2.

The step s203 comprises following steps.

s203-1, the red photoresist is formed on a substrate after the step s202 by means of spin coating; and the red photoresist is exposed and developed by using a mask to form a remaining region and a removed region on the red photoresist. The remaining region correspondingly forms the red color filter layer pattern, and the red photoresist in the removed region is fully removed.

s203-2, the green photoresist is formed on the substrate after the step s203-1 by means of spin coating; and the green photoresist is exposed and developed by using a mask to form a remaining region and a removed region on the green photoresist. The remaining region correspondingly forms the green color filter layer pattern, and the green photoresist in the removed region is fully removed.

s203-3, the blue photoresist is formed on the substrate after the step s203-2 by means of spin coating; and the blue photoresist is exposed and developed by using a mask to form a remaining region and a removed region on the blue photoresist. The remaining region correspondingly forms blue color filter layer pattern, and the blue photoresist in the removed region is fully removed.

s203-4, a planarizing protective layer 7 is formed on the substrate after the step s203-3; i.e., a planarizing protective layer 7 is formed on a side of the black matrix pattern and the color filter layer pattern facing away from the substrate. The structure of the substrate after this step is shown in FIG. 6.

In particular, the planarizing protective layer 7 is formed on a side of the black matrix pattern and the color filter layer pattern facing away from the substrate by means of depositing, sputtering or coating. The planarizing protective layer may be made from an organic resin material.

In case that the color filter substrate in the present embodiment is a color filter substrate for a TN (Twisted-Nematic)-based TFT-LCD, the fabricating method further comprises following steps.

A11-1, a common electrode pattern is formed on a substrate after the step s204; that is, the common electrode pattern is formed on a side of the planarizing protective layer facing away from the substrate.

A12-1, a spacer pattern is formed on the substrate after the step A11-1; that is, the spacer pattern is formed on a side of the common electrode pattern facing away from the substrate.

Alternatively the fabricating method further comprises:

A11-2, a spacer pattern is formed on the substrate after the step s204; that is, the spacer pattern is formed on a side of the planarizing protective layer facing away from the substrate.

A12-2, a common electrode pattern is formed on the substrate after the step A11-2; that is, the common electrode pattern is formed on a side of the spacer pattern facing away from the substrate.

In case that the color filter substrate in the present embodiment is a color filter substrate for a ADS (ADvanced Super Dimension Switch)-based TFT-LCD, the fabricating method further comprises following steps.

A21, a spacer pattern is formed on the substrate after the step s204; that is, the spacer pattern is formed on a side of the planarizing protective layer facing away from the substrate.

A22, a backside shielding electrode pattern is formed on a side of the substrate without the black matrix pattern or color filter layer pattern. The backside shielding electrode may be formed from a material selected from transparent conductive materials such as indium tin oxide (ITO). It should be noted that since the backside shielding electrode pattern is formed on one side of the substrate and the black matrix, recesses, red color filter layer, green color filter layer, blue color filter layer and planarizing protective layer are all formed on the other side of the substrate, the step A22 may be performed before, during or after the steps of s201-~A21.

The ADS (ADvanced Super Dimension Switch) technology creates a multi-dimensional electrical field mainly consisted of an electric field produced by edges of slit electrodes in the same plane and an electric field generated between the slit electrode layer and a plate electrode layer, so as to rotate all oriented liquid crystal (LC) molecules located between the slit electrodes and right above the electrodes in the LC cell, thereby improving the operation efficiency of LC while increasing the transmission efficiency. The ADS technology can improve the image quantity of TFT-LCD products with advantages such as high resolution, high transmission, low power consumption, broad field of view, high aperture ratio and low chromatic aberration, no push Mura. Modified technologies based on ADS include I-ADS technology with high-transmission, H-ADS technology with high aperture ratio, S-ADS technology with high resolution, and so on.

The backside shielding electrode is usually connected to a ground disposed in the color filter substrate or the array substrate, for discharging external electrostatic charges through the ground to effectively avoid external static interference and electromagnetic interference.

The other aspects of the present embodiment are substantially the same as the first embodiment, thus the details is repeated herein.

The Third Embodiment

The present embodiment provides a color filter substrate comprising a substrate as well as black matrix and color filter layer disposed on the substrate. The black matrix pattern partitions a plurality of sub-pixel regions on the substrate, and the color filter layer covers over the plurality of sub-pixel regions comprising a transmissive region and/or a reflective region. A plurality of recesses is provided on the substrate, and each transmissive region in the sub-pixel regions corresponds a respective recess in terms of location.

"The sub-pixel region comprising a transmissive region and/or a reflective region" refers to that each sub-pixel region comprises both the transmissive region and the reflective region. Alternatively it might refer to that some of the sub-pixel regions comprise only the transmissive region, and some of the sub-pixel regions comprise only the reflective region. Of course, in any case, recesses are only formed on the part of the substrate corresponding to the transmissive regions. In case that each sub-pixel region comprises both the transmissive region and the reflective region, the two regions are not limited in terms of shape or location. For example, the transmissive region and reflective region may be located on left and right sides of the subpixel region, respectively; Alternatively, the transmissive region can be located at the center, and the reflective region can surrounds the transmissive region.

The substrate may be a transparent substrate in a form of glass substrate, quartz substrate or plastic substrate; the black matrix may be made from resin or metal.

In an example, the color filter layer at least comprises a red color filter layer, a green color filter layer and a blue color filter layer. It should be noted that the color filter layers are not limited to a red color filter layer, a green color filter layer and a blue color filter layer, but can also comprise other combination such as yellow filter layer, transparent color filter layer, crimson color filter layer and purple color filter layer. Any color filter layer formed by any single color and combination or variation thereof conceivable by a person skilled in the art may be used as the color filter layer according to the embodiment of the present invention.

According to the present embodiment, for the color filter layers of the same color, the color filter layer corresponding to the transmissive region (that is, the portion covering over the transmissive region) on the color filter substrate has a thickness greater than that of the color filter layer corresponding to the reflective region (that is, the portion covering over the reflective region). The thickness difference between color filter layers corresponding to transmissive region and reflective region can be adjusted by adjusting the depth of the plurality of recesses, so as to obtain the effect of color coordination.

The present embodiment further provides a display device comprising the color filter substrate described as above. The display device may be any product or component with a display function, such as LCD panel, mobile phone, tablet, television, display, laptop, digital frame and navigator.

The Fourth Embodiment

The present embodiment provides a color filter substrate. As shown in FIG. 6, the color filter substrate comprises: a substrate 1; a black matrix 2, a red color filter layer 4, a green color filter layer 5 and a blue color filter layer 6 which are disposed on the substrate 1; and, a planarizing protective layer 7 disposed on the black matrix 2, red color filter layer 4, green color filter layer 5 and blue color filter layer 6.

The pattern of the black matrix 2 partitions a plurality of sub-pixel regions on the substrate 1. The pattern of the black matrix 2 is in a form of mesh. The red color filter layer 4, green color filter layer 5 and blue color filter layer 6 covers over the plurality of sub-pixel regions, respectively. Each sub-pixel region comprises a transmissive region and a reflective region. Moreover, a plurality of recesses 3 is provided on the substrate 1. Each transmissive region in the sub-pixel regions corresponds to a respective recess in terms of location, and each transmissive region in the sub-pixel regions has a cross sectional shape which is the same as that of a recess corresponding to the transmissive region. The cross section is in parallel with the surface of the substrate.

In an example, the recess 3 has a depth which is 0.4~0.6 time of a thickness of the color filter layer covering over the recess. For example, the recess has a depth of 0.5 μm~1.0 μm.

Further, in an example, the recess 3 has a depth which is 0.5 time of a thickness of the color filter layer covering over the recess; that is, the color filter layer (i.e., the red color filter layer 4, the green color filter layer 5 or the blue color filter layer 6) covering over the recess has a thickness which is two times of a thickness of the color filter layer covering over the reflective region II in the sub-pixel region corresponding to the recess.

It should be noted that in respect of color coordination, the recesses covered with color filter layers of different colors may have different depth; that is to say, all the recesses formed on the substrate may not have the same depth, and a person skilled in the art can design the depths of the recesses corresponding to color filter layers of different colors according to real needs.

In case that the color filter substrate in the present embodiment is a color filter substrate for a TN (Twisted-Nematic)-based TFT-LCD, the color filter substrate further comprises a common electrode and a spacer. The common electrode is disposed on a side of the planarizing protective layer facing away from the substrate, and the spacer is disposed on a side of the common electrode facing away from the substrate. Alternatively, the spacer is disposed on a side of the planarizing protective layer facing away from the substrate, and the common electrode is disposed on a side of the spacer facing away from the substrate.

In case that the color filter substrate in the present embodiment is a color filter substrate for an ADS (ADvanced Super Dimension Switch)-based TFT-LCD, the color filter substrate further comprises a backside shielding electrode and a spacer. The backside shielding electrode is disposed on a side of the substrate without the black matrix and color filter layer, and the spacer is disposed on a side of the planarizing protective layer facing away from the substrate.

The backside shielding electrode is usually connected to a ground disposed in the color filter substrate or the array substrate, for discharging external electrostatic charges through the ground to effectively avoid external static interference and electromagnetic interference.

The present embodiment further provides a display device comprising the color filter substrate described as above. The display device may be any product or component with the display function, such as LCD panel, mobile phone, tablet, television, display, laptop, digital frame and navigator.

The other aspects of the present embodiment are substantially same as the third embodiment, thus details are not repeated herein.

The above embodiments in only for illustrating the present disclosure and not for limiting the present disclosure. The skilled in the art can implement various modifications and variations without departing from the spirit and scope of the present disclosure, and all equivalent technical solutions fall into the scope of the present disclosure. The protection scope of the present disclosure is defined by appended claims.

What is claimed is:

1. A fabricating method of a color filter substrate, comprising steps of:
    forming a black matrix pattern and a color filter layer pattern on a substrate, and the black matrix pattern partitioning a plurality of sub-pixel regions on the substrate, the color filter layer covering over the plurality of sub-pixel regions, the sub-pixel region comprises a transmissive region and a reflective region;
    wherein, before forming the color filter layer pattern, the fabricating method further comprises a step of forming a plurality of recesses on the substrate, and a location of a each transmissive region in the sub-pixel regions corresponds to a location of a respective recess, wherein the fabricating method further comprises a step of forming a planarizing protective layer on a side of the black matrix pattern and the color filter layer pattern facing away from the substrate;
    wherein the fabricating method further comprises a step of forming a backside shielding electrode pattern on a side of the substrate without the black matrix pattern and the color filter layer pattern, and a step of forming a spacer pattern on a side of the planarizing protective layer facing away from the substrate.

2. The fabricating method according to claim 1, wherein the step of forming the color filter layer pattern comprises:
    applying a color photoresist on the substrate formed with the plurality of recesses; and
    exposing and developing the color photoresist by using a mask to form a remaining region and a removed region on the color photoresist,
    the color photoresist in the remaining region correspondingly forms the color filter layer pattern, and the color photoresist in the removed region is fully removed.

3. The fabricating method according to claim 1, wherein, the recess has a depth which is 0.4~0.6 time of a thickness of the color filter layer covering over the recess.

4. The fabricating method according to claim 3, wherein, the recess has a depth which is 0.5 time of a thickness of the color filter layer covering over the recess.

5. The fabricating method according to claim 1, wherein the color filter layer at least comprises a red color filter layer, a green color filter layer and a blue color filter layer; the black matrix pattern is in a form of mesh; each transmissive region in the sub-pixel regions has a cross sectional shape which is the same as that of a recess corresponding to the transmissive region.

6. The fabricating method according to claim 1, wherein, the fabricating method further comprises a step of forming a common electrode pattern and a spacer pattern on a side of the planarizing protective layer facing away from the substrate.

7. A color filter substrate, comprising a substrate, a black matrix and a color filter layer disposed on the substrate;
    the black matrix partitioning a plurality of sub-pixel regions on the substrate, the color filter layer covering over the plurality of sub-pixel regions, the sub-pixel region comprising a transmissive region and a reflective region;
    wherein, a plurality of recesses is provided on the substrate, and a location of each transmissive region in the sub-pixel regions corresponds to a location of a respective recess, wherein the color filter substrate further comprises a planarizing protective layer disposed on a side of the black matrix and of the color filter layer facing away from the substrate;

wherein the color filter substrate further comprises a backside shielding electrode and a spacer, the backside shielding electrode is disposed on a side of the substrate without the black matrix and the color filter layer, and the spacer is disposed on a side of the planarizing protective layer facing away from the substrate.

8. The color filter substrate according to claim 7, wherein, the recess has a depth which is 0.4~0.6 time of a thickness of the color filter layer covering over the recess.

9. The color filter substrate according to claim 8, wherein, the recess has a depth which is 0.5 time of a thickness of the color filter layer covering over the recess.

10. The color filter substrate according to claim 7, wherein the color filter layer at least comprises a red color filter layer, a green color filter layer and a blue color filter layer; the black matrix is in a form of mesh; each transmissive region in the sub-pixel regions has a cross sectional shape which is the same as that of the recess corresponding to the transmissive region.

11. The color filter substrate according to claim 7, wherein, the color filter substrate further comprises a common electrode and a spacer, the common electrode is disposed on a side of the planarizing protective layer facing away from the substrate, and the spacer is disposed on a side of the common electrode facing away from the substrate; or the spacer is disposed on a side of the planarizing protective layer facing away from the substrate, and the common electrode is disposed on a side of the spacer facing away from the substrate.

12. A display device, comprising a color filter substrate comprising a substrate, a black matrix and a color filter layer disposed on the substrate;

the black matrix partitioning a plurality of sub-pixel regions on the substrate, the color filter layer covering over the plurality of sub-pixel regions, the sub-pixel region comprising a transmissive region and a reflective region;

wherein, a plurality of recesses is provided on the substrate, and a location of each transmissive region in the sub-pixel regions corresponds to a location of a respective recess;

wherein the color filter substrate further comprises a planarizing protective layer disposed on a side of the black matrix and the color filter layer facing away from the substrate; and wherein the color filter substrate further comprises a backside shielding electrode and a spacer, the backside shielding electrode is disposed on a side of the substrate without the black matrix and the color filter layer, and the spacer is disposed on a side of the planarizing protective layer facing away from the substrate.

13. The display device according to claim 12, wherein the recess has a depth which is 0.4~0.6 time of a thickness of the color filter layer covering over the recess.

14. The display device according to claim 12, wherein the color filter layer at least comprises a red color filter layer, a green color filter layer and a blue color filter layer; the black matrix is in a form of mesh; each transmissive region in the sub-pixel regions has a cross sectional shape which is the same as that of the recess corresponding to the transmissive region.

15. The display device according to claim 12, wherein the color filter substrate further comprises a common electrode and a spacer, the common electrode is disposed on a side of the planarizing protective layer facing away from the substrate, and the spacer is disposed on a side of the common electrode facing away from the substrate; or the spacer is disposed on a side of the planarizing protective layer facing away from the substrate, and the common electrode is disposed on a side of the spacer facing away from the substrate.

* * * * *